Dec. 10, 1935.  E. H. ALDEBORGH ET AL  2,024,021
DIAL PLUG GAUGE
Filed Sept. 2, 1933
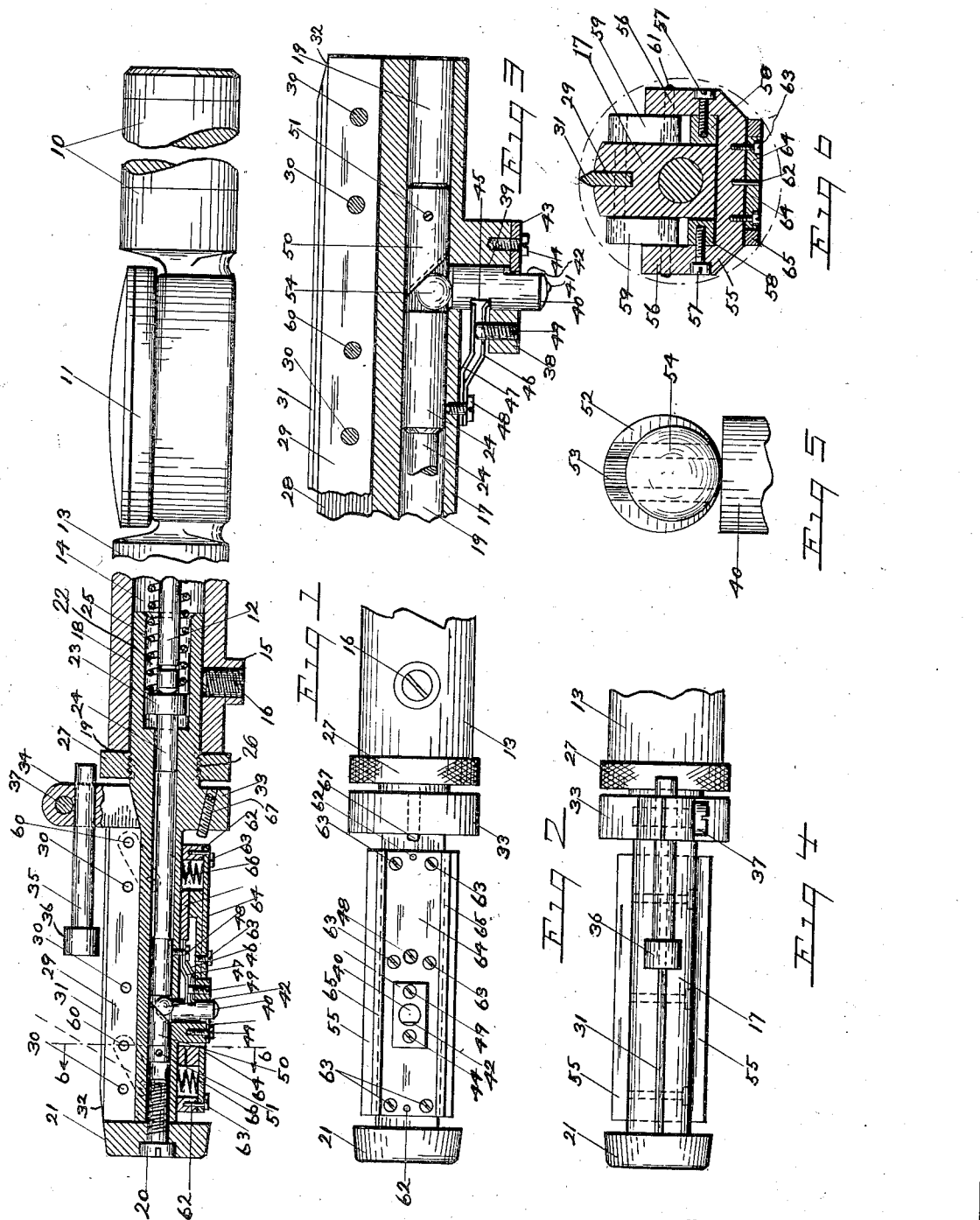
INVENTOR-
Erik H. Aldeborgh.
Alfred H. Emery.
BY
John Thompson
ATTORNEY- Patented Dec. 10, 1935

2,024,021

UNITED STATES PATENT OFFICE 2,024,021

DIAL PLUG GAUGE

Erik H. Aldeborgh and Alfred H. Emery, Poughkeepsie, N. Y., assignors to Standard Gage Company, Inc., Poughkeepsie, N. Y., a corporation of New York Application September 2, 1933, Serial No. 688,578

5 Claims. (Cl. 33—178)

This invention relates to a dial plug gauge of that class which is intended for the measurement and checking of internal dimensions, and the present invention is an improvement over that shown in our application Serial No. 612,190 which was filed on May 19, 1932.

While the general idea of the present invention as herewith illustrated, described and claimed is similar to that shown in the above referred to application, some of the details of construction and combination of parts have been changed, not only to facilitate in the manufacture, but to provide new and more practical features in the use and operation of the instrument.

The primary object of the invention is to provide a plug gauge in which the bore of the work to be measured is alined thereon both with respect to the axis of the work and on the diametrical center line, so that the measurement is taken on the true center line, and that irregularities in the bore of the work may be detected.

Another object of the invention is to locate the bore of the work upon the gauge in parallel relation with the bore of the gauge before the gauging contact point is brought into contact with the bore of the work piece.

A further object being to provide means whereby the several movable parts of the instrument may be adjusted quickly and easily without having to disassemble any parts of the instrument.

Internal plug gauges have been heretofore made with several so called alining edges upon which the work piece is placed, but these edges have been combined with the gauging or measuring edges, or there have been four of such edges employed with a gauging plunger mounted midway between two of the locating edges and in such a manner that while the gauging point is in contact with the bore, there is no edge in contact with the bore diametrically opposite, so that no true diametrical dimension can be obtained, but only an angular measurement, as any irregularity between the locating edges opposite the gauging point can not be detected.

In other plug gauges for this purpose, the locating edges or plungers are mounted in the body of the gauge in an independent manner from each other and upon springs, so that these edges may be rocked or tipped when entering the bore of the work which will throw them out of parallel relation with the bore of the work, this rendering the gauge inaccurate and hard to use, as the operator must adjust the gauge in the bore of the work until he has located a true center line before the measurement can be taken.

These and other objections to the present type of internal plug gauge has been overcome in our present design which will hereinafter be fully described and claimed, and it is understood that other slight changes may be made in the construction and combination of parts without departing from the spirit of the invention.

In the drawing—

Figure 1 shows a side elevation of the instrument, with the gauging unit and a part of the handle in section, to illustrate the construction and arrangement of the operating mechanism.

Figure 2 shows a bottom view of the gauging unit member.

Figure 3 is an enlarged partial sectional view of the gauging stationary body member with the movable member removed, showing the adjustment for the plunger, ball and contact measuring point.

Figure 4 shows a top plan view of the gauging unit member.

Figure 5 shows an enlarged view of the ball, the anvil for the ball and the upper part of the measuring contact point.

Figure 6 is an enlarged cross sectional view taken on the line 6—6 of Figure 1, and shows the assembly of the movable member and the wearing and contact plates.

Referring to the drawing—

The instrument comprises a handle or body member 10, within which is mounted a dial indicator 11 of the usual type, the operating plunger 12 of which is located in the tubular shank 13 of the handle member 10; said shank 13 being formed with the tubular bore 14 and provided with a boss 15 within which is threaded a lock screw 16, which retains the shank 13 of the gauging unit within the bore 14.

Gauging units of different sizes, shapes, etc., may be interchanged with the same dial indicator and handle, or dials with special graduations may be interchanged with the same handle and gauging unit.

For purposes of manufacture and for replacing any parts that may through continued use and contact with the work pieces, become worn, the gauging unit is constructed partly of bronze or other suitable material, to which are detachably secured, wearing surfaces of hardened and ground steel tipped with a harder material.

As shown in the drawing, the gauge is composed of the stationary body member 17 which is provided with the attaching shank 18, both of which are formed with the axial bore 19, which is threaded at the outer end for a screw 20 which holds the nose 21 in place thereon, while the inner end of said bore 19 is recessed as at 22 for the end of the dial indicator plunger 12 and the head 23 of the operating plunger rod 24, against which is one end of the spring 25 which is mounted within said recess 22 and the bore 14 of the handle member 10.

For adjusting the relation with and between the dial indicator plunger 12 and the operating plunger rod 24, the gauging unit member shank 18 is provided with the threads 26 on which is threaded the adjusting and locking nut 27, in such a manner that by rotating said nut against the end of the handle member shank 13 the position of the gauging unit shank 18 may be varied with respect to the shank 13 and locked in position by the set screw 16.

The upper part of the gauging unit member is formed with a longitudinal slot 28 in parallel relation with its bore 19, and mounted within this slot 28 is a steel plate 29 which is held in place by the transverse screws 30, while the upper edge of said steel plate 29 is provided with a contact edge 31 of very hard material to form a combined locating, alining and gauging edge, having a beveled forward end 32 to conform to the bevel of the nose 21, while the rear end of said plate 29 abuts a stop shoulder 33 formed integral with the body member 17 and which is formed with a boss 34 within which is mounted in an adjustable manner a stop pin 35 which is formed with a head 36 and which is held in the boss 34 by the lock screw 37.

Referring to Figure 3, the body member 17 on the lower part thereof is formed with an L-shaped boss 38 having a bearing 39 at right angles to the bore 19 and communicating therewith and within which is slidably mounted the gauging contact point 40, which is formed with a diamond pointed outer end 41, and a flatted side 42 against which is held a plate 43 by the screw 44 for the purpose of preventing said contact point from rotating.

For providing both a stop and a tension on the contact point 40 the same is notched as at 45 for the reception of a tension spring 46 and a stop spring 47, both of which are secured to the body 17 by the screw 48, while an adjusting screw 49 is threaded through said boss 38, and extends through a hole in the spring 46 and bears against the stop spring 47 regulating the position of the contact pointer 40.

Within the bore 19 is secured an anvil block 50 by the pin 51, and this anvil block 50 is formed with a beveled face 52 which is also formed with a central groove 53 (see Figure 5) and resting within this groove 53 and centralized thereby is a ball 54 of slightly less diameter than the diameter of the bore 19; said ball 54 also contacting with the end of the contact point 40 and the end of the operating plunger rod 24, in such a manner that the hardened steel ball 54 cannot come into contact with the bore 19, but will at all times be only in contact with the hardened steel parts 24 and 40; the object of the ball being to impart movement from the pointer 40 to the operating plunger rod 24 and so to the dial plunger 12.

Referring to Figures 1 and 6, the movable alining and gauging member 55 is U-shaped in cross section and is composed of the bottom 55 and the sides 56 which embrace and are spaced from the sides of the stationary body member 17, while within the inner corners of said member 55 are secured by the screws 57 the two wearing plates 58 of hardened steel and which may be renewed as desired.

For attaching the movable member 55 to the stationary body member 17 and retaining the movement of the same parallel at all times, the links 59 are employed which are placed between the sides 56 and the body member 17 and which are pivoted to the body member 17 by the pins 60 and to the sides 56 of the movable member 55 by the pins 61; the pins 60 being freely movable in the body 17 and the pins 61 being movable in the links 59.

To the bottom 55 is secured by the dowel pins 62 and the screws 63 a wearing plate 64, the edges of which are provided with hardened contact strips 65 which provide the two alining edges which are at all times parallel with the edge 31.

For normally retaining the movable member in an extended position with respect to the stationary member, the coil springs 66 are placed between the stationary member 17 and the movable member 55, and to limit this movement between said members 17 and 55, there is provided a stop screw 67 which is threaded through the shoulder 33 and abuts the end of the movable member 55.

For locating the work pieces upon the instrument and preventing such pieces as rings from being pushed too far so as to pass the gauging contact point 40, there is provided an adjustable stop pin 35 slidably mounted in the ear 34 and locked therein by the screw 37.

Having thus described our invention, what we claim as new and desire to secure by Letters Patent, is:—

1. In an adjustable plug gauge, the combination comprising a body member formed with an axial bore and a second bore at right angles thereto and having a contact plunger slidably mounted within said second bore and an indicator operating plunger slidably mounted in said axial bore, of an anvil plug rigidly secured in said axial bore in spaced relation to said operating plunger and said contact plunger, said anvil plug formed with an inclined grooved face, and a ball of smaller diameter than the diameter of the axial bore, mounted in said axial bore in operating contact with the grooved face of the anvil plug and with the end of both the operating plunger and the contact plunger.

2. In a self aligning plug gauge, the combination comprising a stationary combined gauging and aligning member formed with an axial bore and having a second bore at right angles to and communicating with the axial bore, a contact plunger mounted within said second bore, and a movable aligning member secured to the stationary member, and means for limiting said movement, of means for limiting the sliding movement of the contact plunger within the said second bore, and means for placing a tension on said contact plunger and for preventing its rotation.

3. In a self aligning indicator plug gauge of the class described, the combination comprising a stationary combined gauging and aligning member formed with an axial bore and a second bore at right angles to the axial bore and a contact plunger slidably mounted therein, a dial indicator operating plunger slidably mounted within the axial bore, of an anvil plug formed with a beveled face having a groove therein, said anvil plug rigidly secured within the axial bore in spaced relation to the operating plunger and the contact plunger, and a ball of smaller diameter than the diameter of the axial bore mounted within said axial bore in contact with the beveled face of the anvil plug and the ends of both the contact plunger and the operating plunger to transmit movement from the contact plunger to the operating plunger.

4. In a self aligning dial indicator plug gauge, the combination comprising a stationary member, a detachable member having a renewable and detachable aligning and gauging edge and formed with an axial bore and a right angular bore, of a movable aligning member U-shaped in cross section, links securing said movable member to said stationary member in parallel relation, a plate detachably secured to said movable member and provided with contact edges parallel with each other and with the detachable aligning edge of the stationary member, wearing strips mounted in the inner corners of said movable member and in contact with the stationary member to retain said movable member in spaced relation with the stationary member and provide a space for the links.

5. In a self aligning dial indicator plug gauge, the combination comprising a stationary member formed with an axial bore and a right angle bore communicating therewith and a movable member linked thereto, of a detachable member having an aligning and gauging edge secured to the stationary member, a plate detachably secured to the movable member and formed with a pair of parallel aligning edges in parallel relation with the aligning and gauging edge of the stationary member, a contact plunger mounted in the right angle bore and formed with a notch in one side and a flat on the other side, a stop secured to the stationary member with its end in engagement with said slot to limit the movement of the contact plunger, a spring secured to said stationary member with its end in engagement with said slot to normally retain said contact plunger in an extended position, and a plate secured to said stationary member with its end contacting with the flat on the contact plunger to prevent the rotation of the plunger.

ERIK H. ALDEBORGH.
ALFRED H. EMERY.